UNITED STATES PATENT OFFICE.

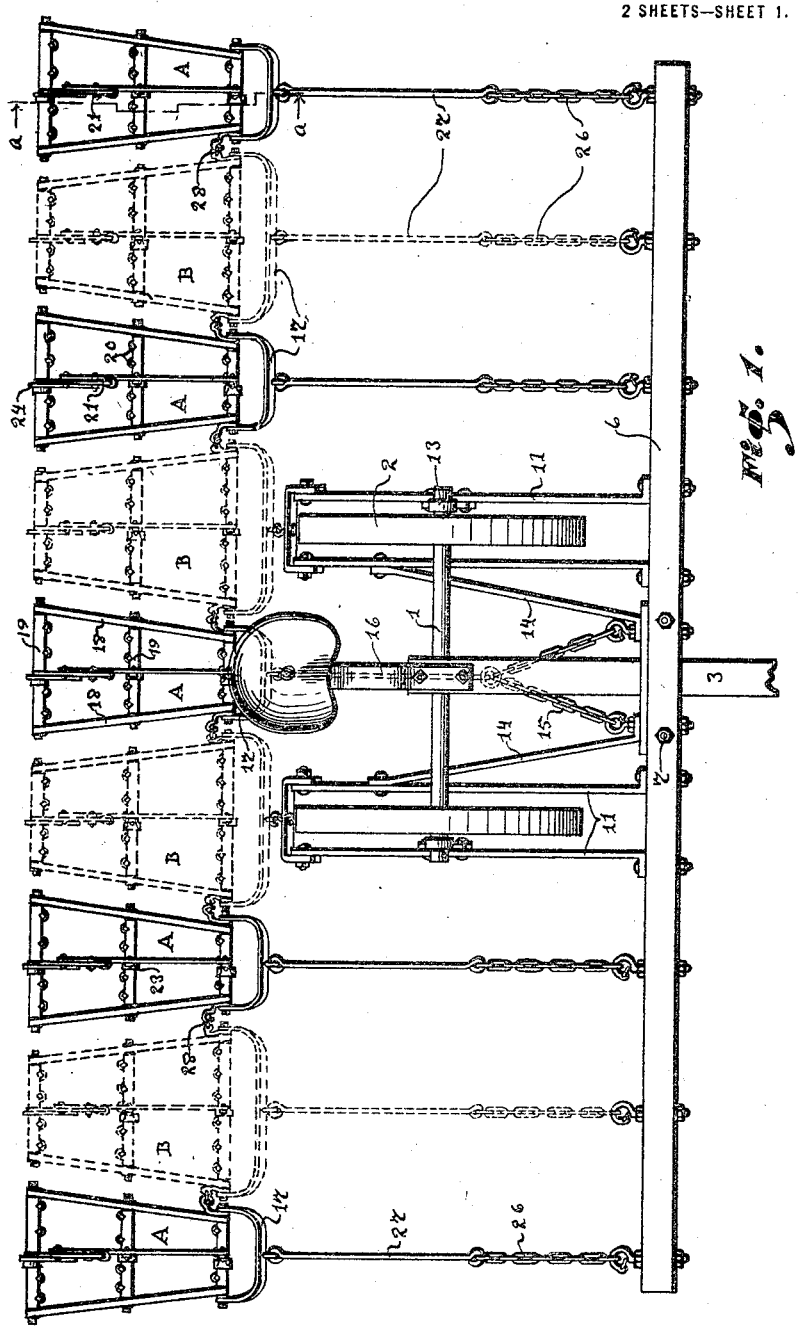

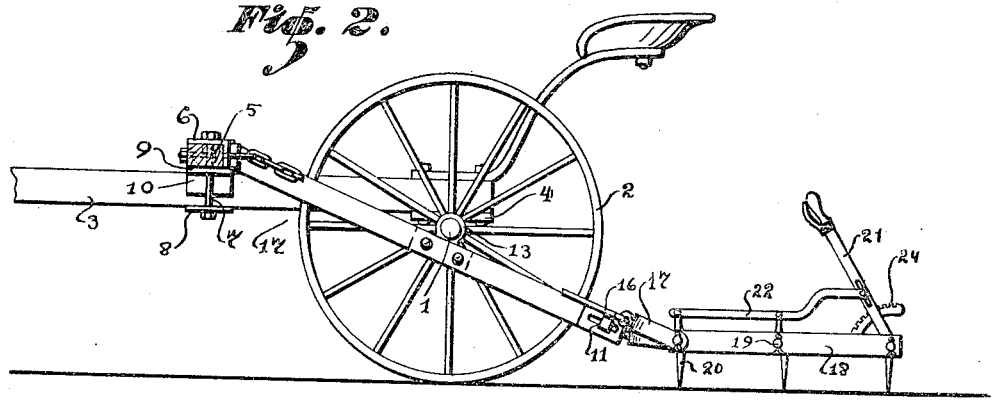
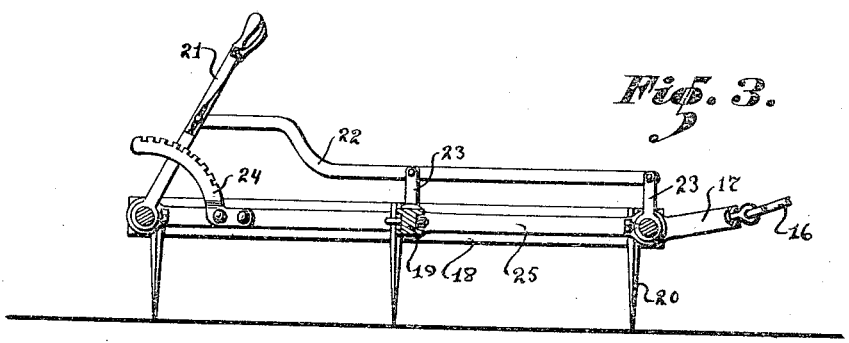
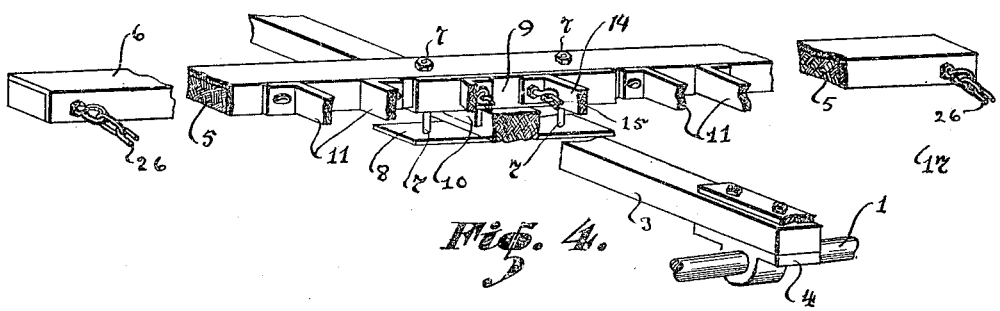

HARRY W. HARLIN, OF HERMLEIGH, TEXAS.

SECTION-HARROW.

1,137,857. Specification of Letters Patent. Patented May 4, 1915.

Application filed June 10, 1914. Serial No. 844,125.

*To all whom it may concern:*

Be it known that I, HARRY W. HARLIN, a citizen of the United States, residing at Hermleigh, in the county of Scurry and State of Texas, have invented certain new and useful Improvements in Section-Harrows, of which the following is a specification.

My invention relates to new and useful improvements in section harrows.

Its object is to provide a section harrow that may be very readily attached to an ordinary planter, cultivator or other farm implement, and which will include a considerable number of harrow sections, alined transversely of the direction of travel, so that the implement will be adapted to harrow a field in a comparatively short time.

Another object of the invention is to provide a connection between the harrow sections that will hold said sections properly spaced so that they cannot interfere with one another when the harrow is being turned at the end of the row, this connection being such however as to allow each section to pivot about its forward end so as to accommodate itself to inequalities in the ground.

A further object of the invention is to provide a section harrow equipped with two sets of harrow sections, one set of which are a permanent feature of the harrow, while the other set may be fastened on or removed according to the nature of the work to be done.

A still further object of the invention is to provide a device of the character described that will be strong, durable, efficient and simple and comparatively inexpensive to produce, also one the several parts of which will not be likely to get out of working order.

With the above and other objects in view, the invention has relation to certain novel features of construction and operation, an example of which is described in the following specification and illustrated in the accompanying drawings, wherein:

Figure 1 is a plan view of my harrow, the permanent set of harrow sections being shown in full lines, and the removable set in dash lines. Fig. 2 is a view of the same in side elevation. Fig. 3 is a detail sectional view of one of the harrow sections, taken upon the line a—a of Fig. 1. Fig. 4 is a detail perspective view showing the manner of securing my harrow to the tongue of a farm implement.

Referring now more particularly to the drawings, wherein like reference characters designate similar parts in all the figures, the numeral 1 denotes the axle and 2 the transporting wheels, and 3 the tongue of an ordinary farm implement, which may be a planter, a cultivator or almost any wheeled farm implement. The connection between the tongue and the axle of the implement is shown as being established by a bearing 4 secured to the rear end of the tongue there beneath and receiving the axle at its center.

A short distance in front of the wheels, there is rigidly and transversely mounted upon the tongue an elongated beam 5, which is reinforced throughout its entire length by a metallic angle bar 6, having its two integral portions respectively contiguous with the top and rear faces of the beam 5. The beam 5 is clamped fast to the tongue at the center of said beam by a pair of vertical bolts 7 disposed at each side of the tongue, their lower ends engaging a plate 8 transversely passing beneath the tongue, and their upper ends receiving nuts screwed fast against the top of the member 6. Between the beam 5 and the tongue there is interposed the horizontal portion of an angular metal bar 9, having its vertical portion contiguous with the vertical portion of the member 6, the bolts 7 being passed through the member 9. In order to more positively insure rigidity between the tongue and the beam 5, the member 9 is integrally formed with a pair of depending ribs 10, engaging the lateral faces of the tongue.

To the composite beam formed by the members 5 and 6, there are secured the forward ends of two U-shaped frames 11, which extend rearwardly from said beam at a downward inclination, passing just beneath the axle, each transporting wheel being mounted between the two parallel inclined portions of one of said frames. To the outermost inclined member of each frame 11, there is secured a bearing 13 receiving the adjacent extremities of the axle.

From the rear end portions of the frames 11, brace bars 14 extend forwardly at a slight inclination toward each other, being rigidly secured at their front ends to the composite beam 5, 6. Between the two brace bars 14, two chains 15 extend convergently rearward, having connection between the tongue, with a rod 16 extending rearwardly and downwardly. The rear end of the rod 16 is attached to the center of a yoke member 17, having its parallel end portions projecting rearwardly and downwardly.

Between the rearwardly projecting ends of the yoke 17, there is engaged the forward end of a harrow section A, comprising a pair of lateral members 18, inclined slightly toward each other from back to front and three equally spaced cross bars 19 parallel to the composite beam 5, 6, the ends of the front bar 19 being loosely mounted in the ends of the yoke 17.

With the harrow section A there is correlated a lever mechanism for simultaneously rocking the three cross bars 19, so as to vary the angle of the teeth 20 relative to the ground. The rearmost bar 19 of each harrow section has rigid connection with a lever 21. With said lever, there is intermediately connected the rear extremity of a bar 22. Said bar extends forwardly above the other two bars 19, and has pivotal connection with a pair of arms 23 projecting rigidly upward from said bars 19. Obviously when the lever 21 is subjected to an angular displacement, the three bars 19 will be rocked, and the teeth 20 will be deflected at an angle with the vertical equal to the angle of deflection of the lever.

In order to hold the lever 21 adjusted in various positions of angular displacement, there is correlated with said lever an arcuate rack 24, having the lower end of the lever as its center of curvature, said rack being mounted upon a bar 25 connecting the three bars 19 of the harrow section midway between the bars 18.

At each side of the harrow section A, there are mounted two other harrow sections A, all the same as that which has been described, and each similarly engaged at its front end between the rearwardly projecting ends of a yoke member 17. The sections A are equidistantly spaced a distance substantially equal to their own width. Each of the two outer sections has connection with the beam 5, 6 by a chain 26 and a rod 27, the chain being attached at its front end to the beam 5, 6 and the rod secured at its rear end to the yoke 17, the other two extremities of the rod and chain being connected.

In Fig. 1, between each two adjacent harrow sections A, there is shown in dash lines a removable harrow section B, the two uttermost sections B having connection with the beam 5, 6, by chains 26 rods 27 and yoke 17, while the other two sections B are engaged (at their front ends) by yokes 17 which are respectively swingingly secured to the rear ends of the frames 11. The removable sections B are somewhat larger than the permanent sections A and have their lateral bars 18 inclined toward each other from front to back instead of from back to front as in the sections A. When both the sections A and B are used they will be flexibly connected at their front ends by two or three chain links as indicated at 28.

When land is being prepared for planting, or when the young crop has just made its appearance the harrows A and B will be used conjointly.

Subsequently when it is desired to cultivate between the rows of plants, the insert harrows (shown in dash lines) will be removed, and only those shown in full lines will be employed, each of the same traveling between two of the rows of plants. Crusts formed by rain are readily dissipated by the harrows passing over the sprouting rows, and early weeds in the rows are eliminated. Later, after each rain it is possible to make rapid headway in breaking the crust between rows and destroying weeds, leaving a good mulch. The rapidity of operation over a given area reduces the loss of moisture to a minimum.

The above described device is designed to meet a long sought requirement for the rapid cultivation of crops in all sections, but it is more especially adapted for use in localities where the sparsity of rainfall demands rapid action to preserve moisture.

The invention is presented as including all such modifications and changes as properly come within the scope of the following claims.

What I claim is:

1. In a device of the character described, the combination with a pair of wheels, an axle, and a tongue, having the usual relation, of a cross bar mounted upon the tongue projecting laterally beyond the wheels, a pair of U-shaped frames, each having its extremity secured to the said cross bar, and each extending rearwardly beneath the axle and having connection therewith, one of the transporting wheels being mounted between the rearwardly extending portions of each of said frames, a harrow section pivotally connected with the rear end of each frame, and means establishing a flexible connection between the harrow sections.

2. In a device of the character described, the combination with a pair of transporting wheels, an axle, and a tongue, having the usual relation, a cross bar rigidly mounted upon the tongue in front of the axle and projecting laterally at each end beyond the transporting wheels, a U-shaped frame disposed at each side of the implement, its forward extremity being secured to said cross bar, and being inclined rearwardly at each side of the adjacent transporting wheel, and having connection with the axle, a yoke member secured at its center to the rear extremity of the U-shaped frame, and a harrow section having its forward end pivotally mounted between the extremities of each yoke member.

In testimony whereof I have signed my name to this specification in the presence of two subscribing witnesses.

HARRY W. HARLIN.

Witnesses:
C. R. LOCKHART,
W. T. SKINNER.